E. SACHS.
BALL BEARING.
APPLICATION FILED APR. 17, 1907.

926,771.

Patented July 6, 1909.

Witnesses:

Inventor
Ernst Sachs

UNITED STATES PATENT OFFICE.

ERNST SACHS, OF SCHWEINFURT, GERMANY.

BALL-BEARING.

No. 926,771.  Specification of Letters Patent.  Patented July 6, 1909.

Application filed April 17, 1907. Serial No. 368,756.

*To all whom it may concern:*

Be it known that I, ERNST SACHS, a subject of the King of Bavaria, residing at No. 5 Schultes street, Schweinfurt, in Germany, have invented new and useful Improvements in Ball-Bearings, of which the following is a specification.

This invention relates to ball bearings consisting of concentric rings with circumferential grooves in the confronting peripheries, being the race-ways for the balls inserted between them, and the special object of the invention is to provide a passage which permits of the easy and ready introduction of the balls between the bearing rings. To this end a groove of arc-shaped cross-section, similar to the race-ways, is formed in a lateral shoulder or flange of one of the rings, which groove is oblique or at an angle to the race-way, so that it resembles a concave thread of screw of a small pitch, extending over about one third to one half of the periphery of the said ring. By this means the assembling of the bearing is enabled by screwing the notched ring into the other containing all balls placed closely together, the series of the same being interrupted at one place alone. With this construction the second ring of the bearing does not require any passage. This arrangement is illustrated in the accompanying drawing which forms a part of this specification.

Figure 1:
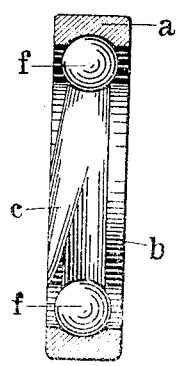
Figure 2:
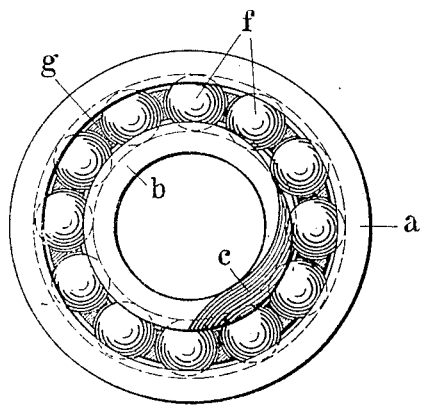
Figure 3:
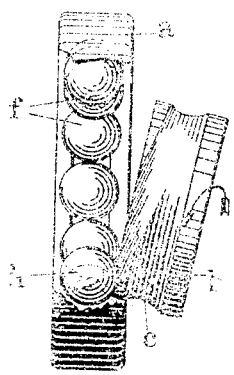
Figure 4:
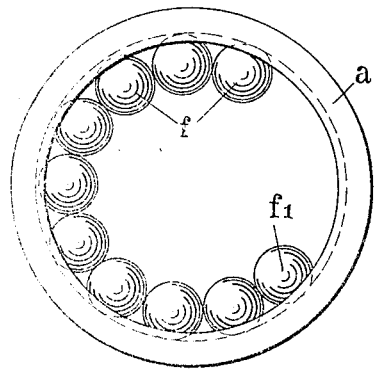

Figure 1 is a partial cross section of the bearing. Fig. 2 is a side elevation of the complete bearing. Fig. 3 represents the parts in the position ready for effecting their interjunction. Fig. 4 is a side elevation of the outer bearing ring with some of the balls placed therein.

The bearing comprises the two undivided rings $a$ and $b$ of steel provided in the confronting peripheries with the usual concave race ways receiving the balls $f$. A groove $c$, in its form similar to the race ways, is worked into the one lateral shoulder or flange of one of the said rings, for example in the ring $b$, as illustrated in the drawing. This groove is directed to the race way in such a manner that they gradually pass or merge into each other, the one being continued by the other, so that the balls being collected in an uninterrupted series can enter the passage $c$ and then into the race way. This passage preferably has the form of a thread of a screw having a small pitch, the pitch being conveniently the smaller the larger the number of the balls to be inserted into the bearing. Instead of as a screw thread, the passage $c$ may be constructed on another regular or irregular curve which allows the balls to enter the race way the one directly behind the other.

The assemblage is enabled by reason of the fact that in assembling all balls of a mounted bearing in close contact with each other, leaving a single but comparatively large interruption at one place, some slight dead motion of the balls in the axial direction is allowed, which permits the inner ring $b$ to be brought into an inclined position with respect to the outer ring, and to be rotated along the balls which are sliding in the passage $c$, the said ring thus being moved into the outer ring by a screwing motion. As soon as the first ball lying aside the above-mentioned interstice has entered the passage $c$, the dead motion above referred to is at once considerably magnified, and so on with the following balls entering the passage.

The elements of the bearing are assembled by first filling the outer ring $a$ with the required number of balls, placing the same in the race way in series, as shown in Fig. 4, then inserting the inner ring $b$ in an inclined position and in such a manner that the outer end of the passage $c$ is in contact with the first ball $f^1$ of the row, as illustrated in Fig. 3. When the ring $b$ is rotated in the direction of the arrow it moves with its passage $c$ over all the balls, gradually receiving the same in the race way and thereby obtaining the position shown in Fig. 1. The balls are now distributed in the bearing and equidistantly secured by a spacer $g$ of any suitable construction (represented in section in Fig. 2). This manipulation will be still further facilitated if the passage $c$ is not only oblique to the race way, but also gradually varies in its distance from the axis of the bearing, that is to say, if it is constructed on a conical spiral line or with eccentricity with respect to the ring, which arrangement is disclosed by Fig. 2 for example. In a passage of this kind the dead motion in axial direction is assisted by an additional dead motion in radial direction for facilitating the screwing of the rings $a$ and $b$ into or out of each other. Obviously the described passage may be provided in the outer ring, instead of the inner ring.

It is not an indispensible condition that the passage $c$ should have just the same depth as the race way, the bottom of which may not be reached by the passage. In such an arrangement the last balls of the series will not pass through the interstice between the passage and the other ring; therefore some pressure must be applied to the construction, when the balls will spring into the race ways, thereby profiting by the resiliency of the material of the rings.

What I claim as my invention, and desire to secure by Letters Patent, is:—

1. A ball-bearing comprising concentric rings with confronting annular ball-races and an interposed series of balls, one ring having a groove or passage running laterally of and oblique to its race-way in such manner that the bearing can be assembled by screwing said ring into place while the series of balls are collected in the race-way of the other ring.

2. A ball-bearing comprising concentric inner and outer rings with confronting annular ball-races and an interposed series of balls, one of the rings having a lateral passage for introducing the balls, said passage running a relatively long distance circumferentially of the ring in the form of a screw-thread of small pitch and merging into the race-way in said ring, in such manner that the ring can be screwed into place.

3. A ball-bearing comprising concentric rings having opposed annular grooves in their confronting peripheries constituting raceways for an interposed series of balls, one ring having in one of its lateral shoulders a relatively long groove extending peripherally from the outer face of the ring oblique to the race-way at a small acute angle and gradually merging into the latter, whereby the bearing can be assembled by screwing the rings one into the other with the series of balls in place.

4. A ball-bearing comprising concentric rings having confronting annular grooves constituting race-ways for an interposed series of balls, one ring having a passage for introducing the balls which consists of a lateral groove oblique to the race-way at a small acute angle and constructed on a conical spiral line and gradually merging into the race-way, whereby said ring can be screwed into the other ring containing the balls.

In testimony whereof I have set my signature to this specification in the presence of two subscribing witnesses.

ERNST SACHS. [L. S.]

Witnesses:
E. BARDEL,
A. LURZL.